United States Patent
Skriver et al.

(10) Patent No.: US 12,500,824 B2
(45) Date of Patent: Dec. 16, 2025

(54) MULTI-PATH MONITORING OF APPLICATION INSTANCES USING DNS-BASED REACHABILITY INFORMATION

(71) Applicant: Cisco Technology, Inc., San Jose, CA (US)

(72) Inventors: Morten Skriver, Hinnerup (DK); Aniela Ariadna Borowczyk, Gorzów Wielkopolski (PL); Félix Hugo Maurer, Carouge (CH); Angeliki Papathanasiou, Cracow (PL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/381,271

(22) Filed: Oct. 18, 2023

(65) Prior Publication Data

US 2025/0132998 A1  Apr. 24, 2025

(51) Int. Cl.
*G06F 15/173* (2006.01)
*H04L 43/08* (2022.01)
*H04L 61/4511* (2022.01)

(52) U.S. Cl.
CPC .......... *H04L 43/08* (2013.01); *H04L 61/4511* (2022.05)

(58) Field of Classification Search
None
See application file for complete search history.

(56) References Cited

U.S. PATENT DOCUMENTS

| | | | | |
|---|---|---|---|---|
| 6,981,055 | B1 * | 12/2005 | Ahuja | H04L 45/42 709/239 |
| 8,199,654 | B2 * | 6/2012 | Francisco | H04L 45/22 709/224 |
| 9,654,503 | B1 * | 5/2017 | Kowalyshyn | H04L 63/1425 |
| 11,075,970 | B2 * | 7/2021 | Gordon | H04L 65/756 |
| 11,546,290 | B1 | 1/2023 | Garcarz et al. | |
| 11,765,219 | B2 | 9/2023 | Gordon | |
| 2008/0049637 | A1 * | 2/2008 | Morrill | H04L 65/1069 370/252 |

(Continued)

OTHER PUBLICATIONS

Mockapetris P., "Domain Names-Implementation and Specification", Network Working Group, Request for Comments: 1035, Nov. 1987, 55 pages.

(Continued)

*Primary Examiner* — Phuoc H Nguyen
(74) *Attorney, Agent, or Firm* — Lee & Hayes, P.C.; James M. Behmke

(57) ABSTRACT

In one embodiment, a device receives a domain name system text record containing Internet reachability information for a plurality of application instances of a particular application identified by a given domain name. The device determines a primary Internet address for a primary application instance of the plurality of application instances and one or more secondary Internet addresses for one or more respective secondary application instances of the plurality of application instances based on the Internet reachability information. The device configures a path monitoring agent to perform path performance monitoring of a network path to the primary Internet address and perform path performance monitoring of one or more alternate network paths to the one or more secondary Internet addresses.

20 Claims, 5 Drawing Sheets

(56) References Cited

U.S. PATENT DOCUMENTS

| | | |
|---|---|---|
| 2011/0099290 A1 | 4/2011 | Swildens et al. |
| 2014/0280803 A1 | 9/2014 | Kazerani et al. |
| 2016/0080230 A1* | 3/2016 | Anand .................... H04L 67/52 |
| | | 709/224 |
| 2016/0294765 A1* | 10/2016 | Mayala ................. H04L 51/234 |
| 2020/0366637 A1 | 11/2020 | Dhanabalan |
| 2021/0092088 A1 | 3/2021 | Ramachandran et al. |
| 2022/0159051 A1 | 5/2022 | Gordon |
| 2022/0231952 A1 | 7/2022 | Barton et al. |
| 2023/0318964 A1 | 10/2023 | Kolar et al. |
| 2023/0327971 A1 | 10/2023 | Kolar et al. |
| 2023/0367833 A1* | 11/2023 | Kol ......................... H04L 67/56 |
| 2024/0187471 A1* | 6/2024 | Gordon ................. H04L 67/566 |

OTHER PUBLICATIONS

Rosenbaum R., "Using the Domain Name System to Store Arbitrary String Attributes", Network Working Group, Request for Comments: 1464, May 1993, 4 Pages.

\* cited by examiner

MULTI-PATH MONITORING OF APPLICATION INSTANCES USING DNS-BASED REACHABILITY INFORMATION

TECHNICAL FIELD

The present disclosure relates generally to computer networks, and, more particularly, to multi-path monitoring of application instances using Domain Name System (DNS)-based reachability information.

BACKGROUND

Application performance and user experience are becoming increasingly important to companies as poor performance and user experience lead to negative consequences for the enterprises accessing a given application. However, assessing the effects of the network on the performance and user experience of an application is also becoming increasingly difficult as many applications are now moving to cloud-hosted environments and served from geographically-distributed locations. More specifically, network path monitoring is typically directed via DNS resolution to the closest server/instance of the application.

When a given server/instance of an application fails, user clients are often left to wait for an updated DNS resolution that associates a new server/instance with the domain name of the application. Doing so can lead to a loss of connectivity to the application until a DNS update has occurred. In addition, there is also no visibility into how the new server/instance of the application will perform, nor how it will affect the user experience, as its identity was previously unknown.

BRIEF DESCRIPTION OF THE DRAWINGS

The implementations herein may be better understood by referring to the following description in conjunction with the accompanying drawings in which like reference numerals may indicate identically or functionally similar elements, of which.

DESCRIPTION OF EXAMPLE EMBODIMENTS

Overview

According to one or more implementations of the disclosure, a device receives a domain name system text record containing Internet reachability information for a plurality of application instances of a particular application identified by a given domain name. The device determines a primary Internet address for a primary application instance of the plurality of application instances and one or more secondary Internet addresses for one or more respective secondary application instances of the plurality of application instances based on the Internet reachability information. The device configures a path monitoring agent to perform path performance monitoring of a network path to the primary Internet address and perform path performance monitoring of one or more alternate network paths to the one or more secondary Internet addresses.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
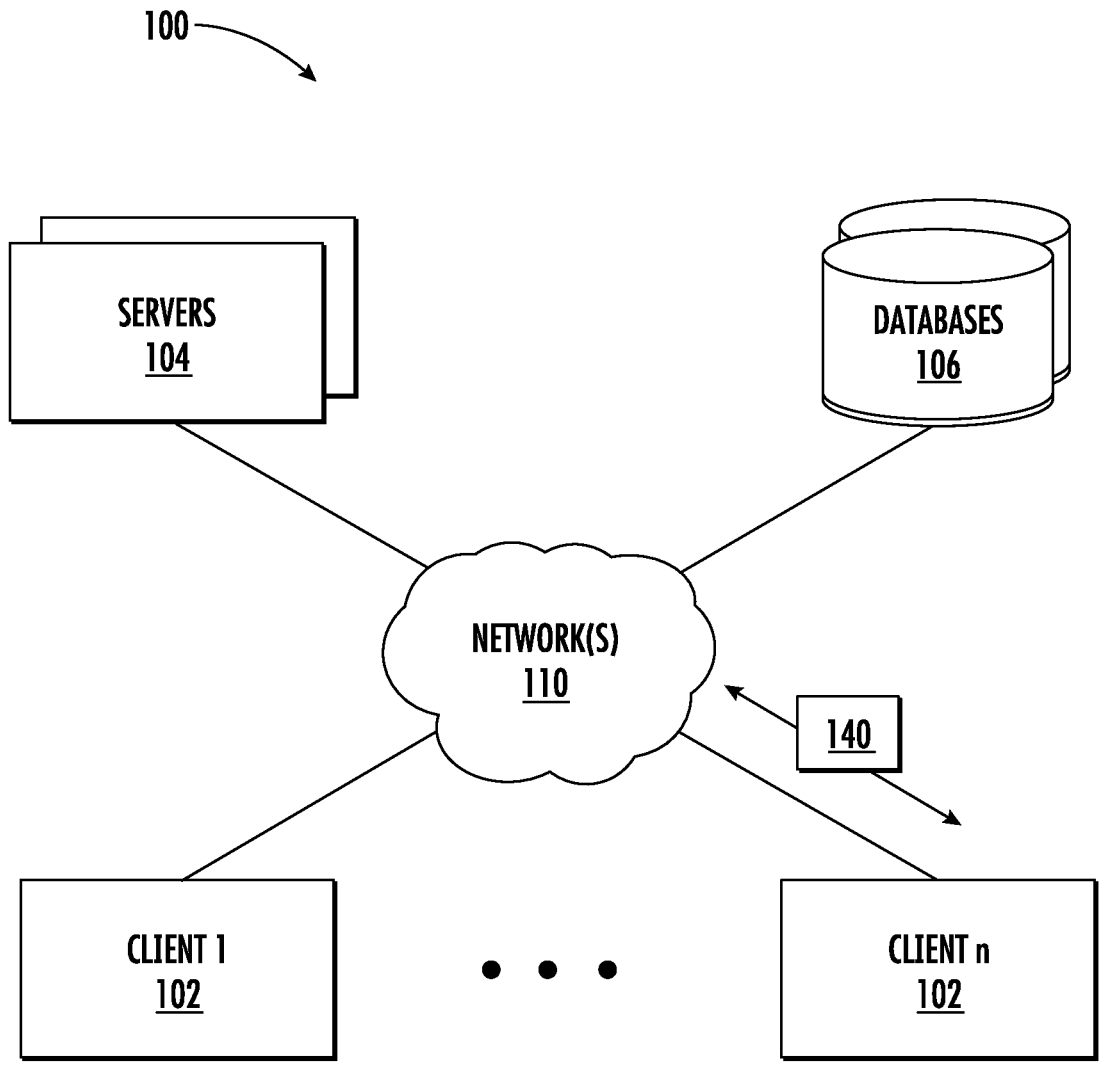
FIG. 1 illustrates an example computer network.

FIG. 1 is a schematic block diagram of an example "simplified" computing system 100 illustratively comprising any number of devices, such as the client devices 102 (e.g., a first through n' client device), servers 104 (e.g., one or more serves), and one or more databases, for example the databases 106, where the devices may be in communication with one another via the networks 110, which may include any number of networks. The networks 110, which can include one or more networks, may include, as would be appreciated, any number of specialized networking devices such as routers, switches, access points, etc., interconnected via wired and/or wireless connections. For example, client devices 102 and/or servers 104 and/or the intermediary devices in networks 110 may communicate wirelessly via links based on Wi-Fi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via networks 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
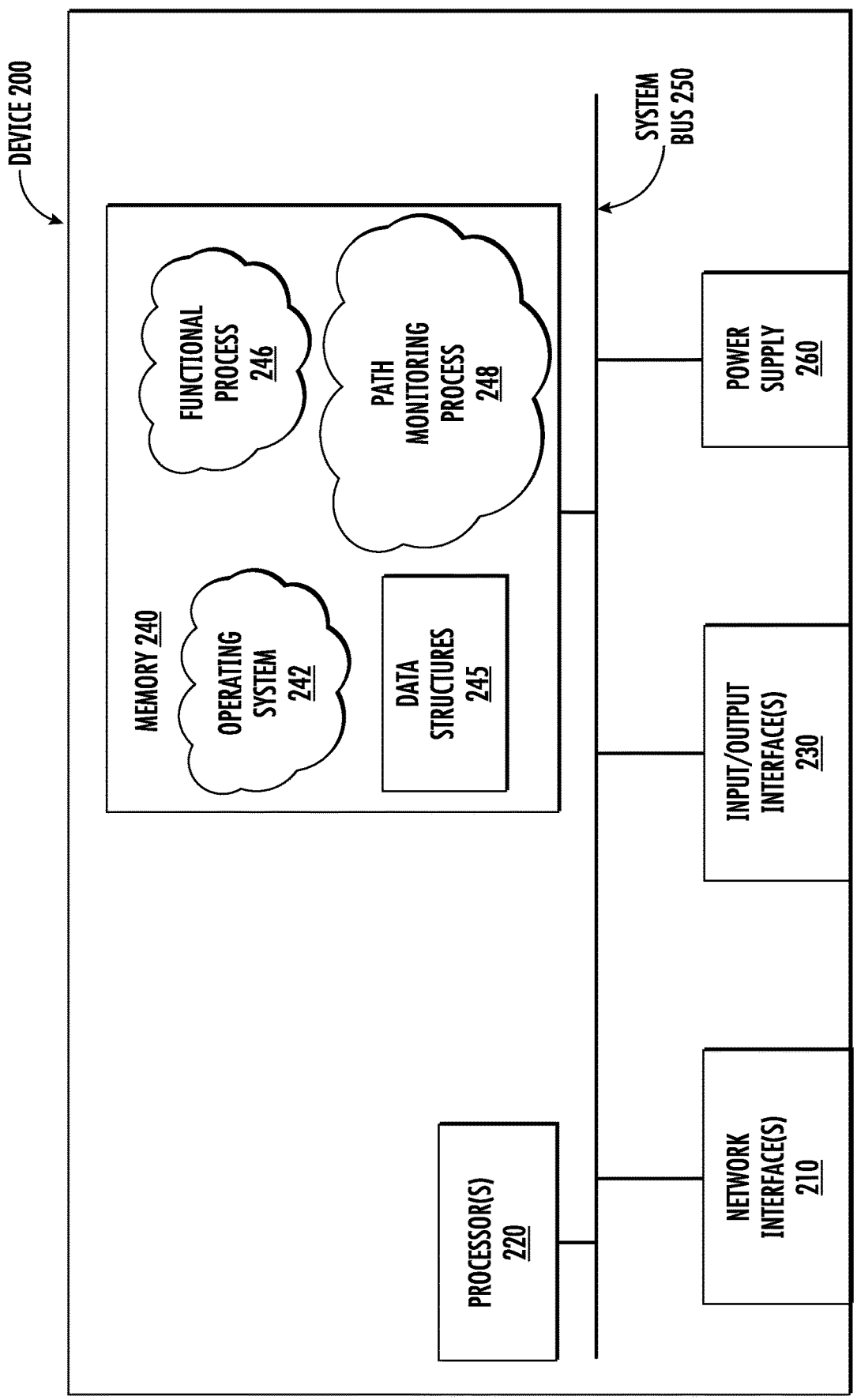
FIG. 2 illustrates an example computing device/node.

FIG. 2 is a schematic block diagram of an example node/device (e.g., an apparatus) that may be used with one or more implementations described herein, e.g., as any of the devices 102-106 shown in FIG. 1 above. The node/device can be referred to herein as a device 200, for brevity, and may comprise network interfaces 210 (e.g., wired, wireless, etc.), at least one processor, such as the processor 220, and a memory 240 interconnected by a system bus 250, as well as a power supply 260 (e.g., battery, plug-in, etc.).

The network interfaces 210 contain the mechanical, electrical, and signaling circuitry for communicating data over links coupled to the networks 110. The network interfaces may be configured to transmit and/or receive data using a variety of different communication protocols. Note, further, that device 200 may have multiple types of network connections via the network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes, which are referred to herein as functional processes 246, and illustratively on certain devices a path monitoring process 248 (e.g., a multi-path monitoring process for application instances using DNS-based reachability information), as described herein. Notably, functional processes 246, when executed by processor 220, cause each device 200 (e.g., one or more of or each particular device) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more implementations herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable implementation of categorical classification.

Figure 3:
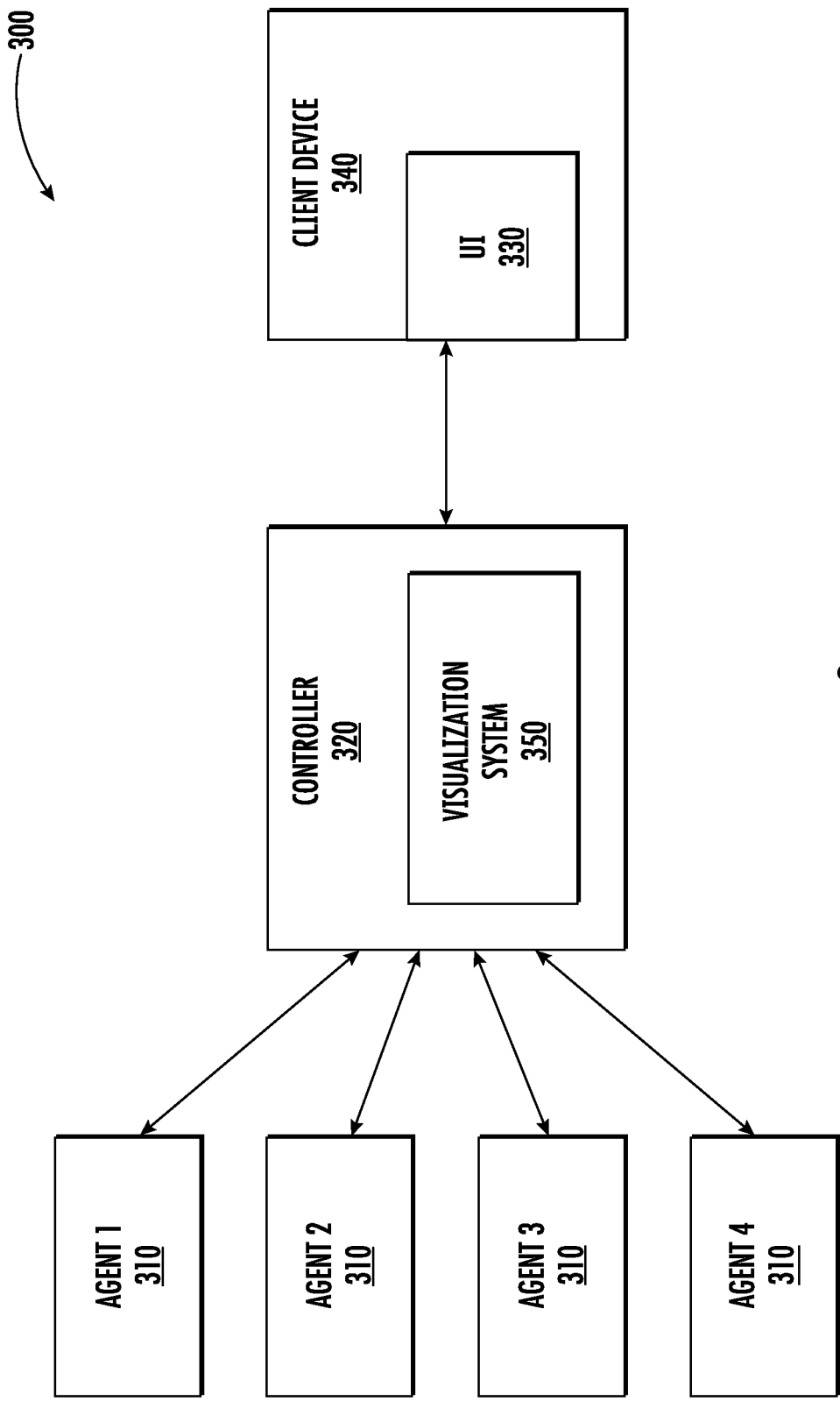
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes agents 310 (e.g., one or more agents) and one or more servers and/or controllers, such as the controller 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 (or controllers) as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents 310 may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page, i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI), which may be referred to as an interface 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controllers 320 receive data from different agents, such as the agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

In accordance with certain implementations, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (e.g., an application instance) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

As noted above, application performance and user experience are becoming increasingly important to companies as poor performance and user experience lead to negative consequences for the enterprises accessing a given application. However, assessing the effects of the network on the performance and user experience of an application is also becoming increasingly difficult as many applications are now moving to cloud-hosted environments and served from geographically-distributed locations. More specifically, network path monitoring is typically directed via Domain Name System (DNS) resolution to the closest server/instance of the application. Thus, any given agent in FIG. 3 may be directed via DNS only to the IP address of the "closest" instance of the application.

When a given server/instance of an application fails, though, user clients are often left to wait for an updated DNS resolution that associates a new server/instance with the domain name of the application. Doing so can lead to a loss of connectivity to the application until a DNS update has occurred. In addition, there is also no visibility into how the new server/instance of the application will perform, nor how it will affect the user experience, as its identity was previously unknown to the monitoring agents in the network.

More specifically, in a distributed application architecture, where either the entire application or parts of the application are served from geographically distributed locations, requests from such synthetic tests are generally directed to the closest application instance to the monitoring agent and/or probe, similar to how real user requests are handled. As a result, these tests generally allow for monitoring network performance of the path to the closest server. Consequently, in case of failure, network monitoring solutions generally wait for a new DNS resolution to occur, get the Internet protocol (IP) address of a second-closest server, and then resume monitoring towards this new Internet protocol address. The IP address of the closest application is generally provided in the DNS response typically using one of the following two DNS mechanisms:

- Anycast DNS where a single IP address is returned for a given DNS query. This IP address is then advertised from each of the locations serving the application, ensuring that clients send their requests to the closest application instance. The definition of closest instance would in this case can be based on IP routing within the network.
- DNS Client Subnet where the IP address returned for a given DNS name depends on the IP address of the application client. This can allow the application/DNS administrator to directly redirect requests to the closest application instance, based on the IP subnet of the client.

While the ability to monitor application performance and user experience towards the closest application instance is crucial to predict the user experience from a given location, it may also be desired to be able to predict the user experience using other application instance(s) in case of failure of the primary server for the application. However, with the DNS implementations mentioned above, it may be difficult or even impossible to determine in advance which will be the secondary server the application is going to fail over to. Consequently, it is often difficult, if not impossible, to measure the network performance towards a secondary server/instance in advance.

—Multi-Path Monitoring of Application Instances Using DNS-Based Reachability Information—

The techniques herein allow for multi-path monitoring of application instances using DNS-based reachability information. In some aspects, the techniques herein allow for the automatic discovery of multiple servers/instances of an online application via DNS resolution. Doing so allows for a monitoring agent in a network to perform network path monitoring of multiple paths to different instances, affording an enterprise greater insight into how use each of the different instances would affect performance and the user experience. Further aspects of the techniques herein allow for the use of this information to make traffic routing decisions, such as directing a given client to the instance that provides the best performance, regardless of its location, and/or configuring a backup instance for the client in the case of the primary application instance becoming unavailable.

The techniques introduced herein allow for the enablement of monitoring agents to measure application performance and/or user metrics (e.g., jitter, loss, etc.) for alternative application IP addresses for different instances by employing encrypted and labeled DNS text records which can include reachability information for all application instances, as opposed to only the primary application instances. As described in more detail herein, implementations of the present disclosure can allow for measuring and predicting application performance in fallback scenarios, thereby providing an enhanced user experience, particularly in full stack observability scenarios. In some implementations, an indication of the impact on application performance in a failure scenario can be provided and/or reported, in addition to allowing for a mapping between client subnet and application instance to be proactively optimized based on application performance and user experience.

Illustratively, the techniques described herein may be performed by hardware, software, and/or firmware, such as in accordance with path monitoring process 248, which may include computer executable instructions executed by the processor 220 (or independent processor of network interfaces 210) to perform functions relating to the techniques described herein.

Specifically, according to various implementations a device receives a domain name system text record containing Internet reachability information for a plurality of application instances of a particular application identified by a given domain name. The device determines a primary Internet address for a primary application instance of the plurality of application instances and one or more secondary Internet addresses for one or more respective secondary application instances of the plurality of application instances based on the Internet reachability information. The device configures a path monitoring agent to perform path performance monitoring of a network path to the primary Internet address and perform path performance monitoring of one or more alternate network paths to the one or more secondary Internet addresses.

Operationally, in various implementations, the techniques herein propose augmenting DNS text records to carry IP reachability information for multiple (or even all) instances of an online application, not just the one closest to a given client. Such DNS text records may be compliant with the Internet Engineering Task Force (IETF) Request for Comments (RFC) 1035 standard, entitled "Domain Names—Implementation and Specification." although other implementations are not so limited. As described in more detail herein, communication with alternative server IP addresses mapped to a given domain name can be provided via DNS, thereby allowing a user or network administrator to not only monitor network performance on the path to the active (e.g., "primary") server, but also to all other regional instances of the same service. These other regional instances (which may be running on servers that are not the active or primary server) can then become the monitoring target in the event that the active server (e.g., the server closest to the client) experiences a failure.

Figure 4:
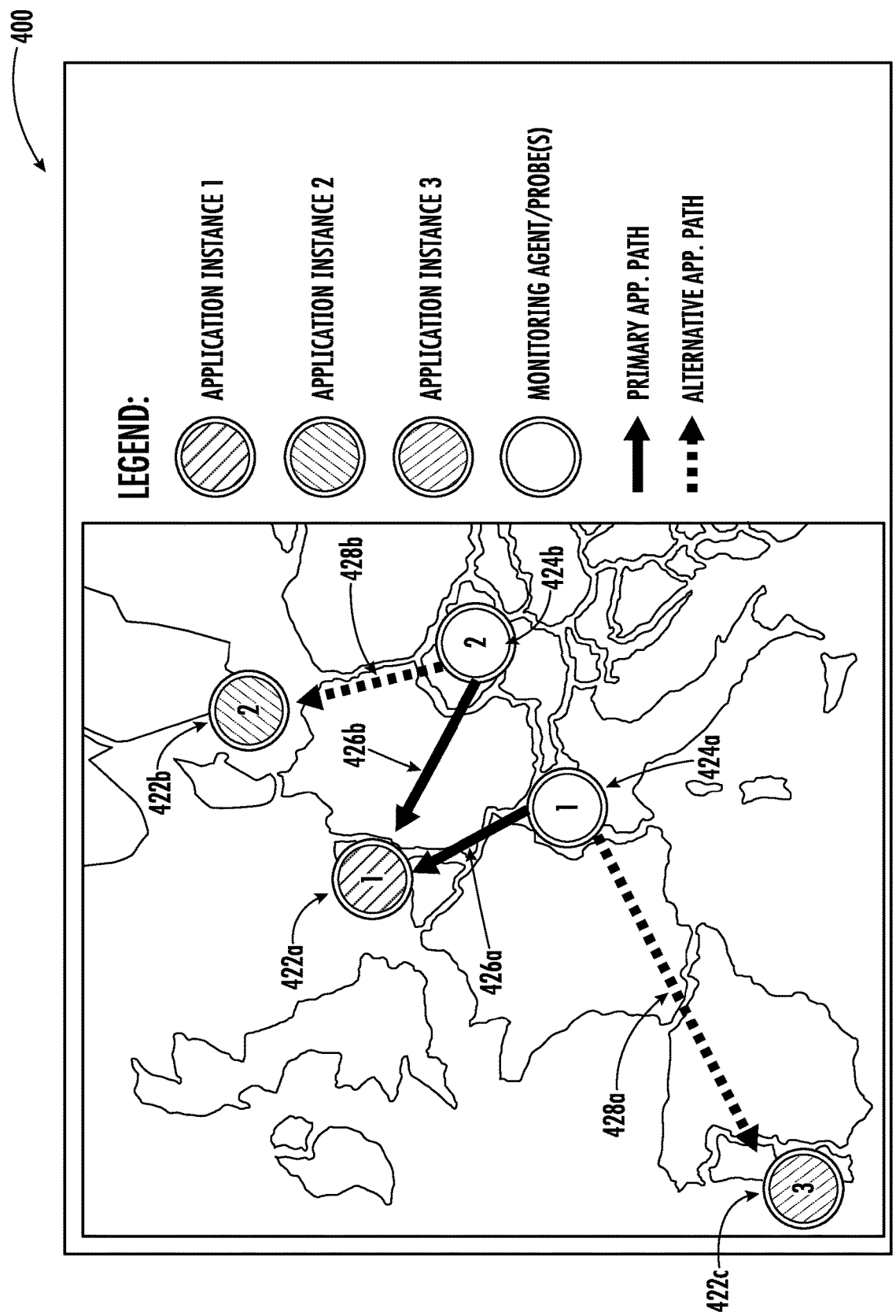
FIG. 4 illustrates an example diagram of multi-path monitoring of application instances using Domain Name System (DNS)-based reachability information.

Operationally, FIG. 4 illustrates an example diagram 400 of multi-path monitoring of application instances using DNS-based reachability information. The non-limiting example illustrated in FIG. 4 shows an arbitrary map with application instances running on different servers in disparate geographical locations. As shown in FIG. 4, a first application instance 422a is running on a computing device, such as a server, in a first geographical location. A second application instance 422b may be running on a computing device in a second geographical location, and a third application instance 422c may be running on a computing device in a third geographical location.

As shown in FIG. 4, monitoring agents 424 (e.g., path probing agents), which be referred to herein as "agents" may also be running at geographical locations that correspond to endpoint clients of the application, networking devices associated with such clients, at other known locations, or anywhere else in the network. For instance, as shown, assume that there is a first agent 424a and a second agent 424b located at geographical locations that differ from that of first application instance 422a, second application instance 422b, and/or third application instance 422c.

In some implementations, the first agent 424a and/or the second agent 424b are configured to measure application performance and/or user experience (e.g., packet loss, delay, jitter, etc.) associated with the closest server (e.g., the active or "primary" server), which, in the non-limiting example of FIG. 4, may be a server that is running the first application instance 422a. Further, the first agent 424a and/or the second agent 424b can be configured to monitor an IP address associated with the first application instance 422a and/or an IP address associated with the second application instance 422b (or other application instances) when such application instances are determined to be running a same service. Accordingly, implementation of the disclosure described herein can predict an impact on application performance, particularly in a failure scenario of the active (e.g., "primary") application instance.

Continuing with the non-limiting example of FIG. 4, an IP address of the alternative application instances (e.g., same application instances running on servers that are not designated as the active or "primary" server) can be communicated using a DNS text record to any or all of the agents 424. For example, IP addresses associated with the alternative application instances, such as the second application instance 422b, the third application instance 422c, etc. can be communicated using a DNS text format similar to the following:

---
v=aim1;<address-family>:<ip app inst1>:<label1>;
<address-family>:<ip app inst2>:<label2>
--- where:
v=aim1 indicates the type and version of the text record;
<address-family> indicates whether the address is an IPV4 or IPv6 address;
<ip of app instX> represents the IP address of the application instance; and/or
<labelX> represents the tag/label associated with the application instance.

As will be appreciated, for highly distributed applications, it may not be desirable to monitor the performance of each and every application instance, because such monitoring may artificially increase the number of synthetic application requests compared to only monitoring the current performance or behavior of the first application instance 422a (e.g., the closest application instance to a given monitoring agent). Thus, in some implementations, the first agent 424a and/or the second agent 424b may also be configured to selectively send requests to a subset of the indicated application instances based on the "label" values shown above. That is, implementations of the present disclosure allow for a given monitoring agent, such as the first agent 424a and/or the second agent 424b to, for example, to selectively monitor the application instances within a particular regional (e.g., continental) vicinity, and avoid monitoring of application instances located outside the regional monitoring vicinity.

In some implementations, a label associated with each application instance (e.g., the first application instance 422a, the second application instance 422b, and/or the third application instance 422c) can be used by the first agent 424a and/or the second agent 424b to select application instances to be probed. For example, as shown in FIG. 4, the first agent 424a may measure the performance of network path to the third application instance 422c, as indicated by the alternative first network path 428a, while the second agent 424b can measure the performance of the second application instance 422b as indicated by the second alternative network path 428b, in addition to both measuring the performance of the first application instance 422a, as indicated by the first primary network path 426a and the second primary network path 426b.

In some implementations, the DNS text record sent to any given monitoring agent (which may be defined in accordance with RFC1035 and/or RFC1464, among other suitable specifications, as discussed above), can be designed to store arbitrary string attributes. A domain name can have multiple text (or "TXT") records associated with it, and each text record may have a limited size of 255 characters. As a result, as the number of instances of an application increases, it may it be useful to split returned instances corresponding to particular IP addresses (e.g., IP addresses associated with the first application instance 422a, the second application instance 422b, and/or the third application instance 422c) into multiple DNS text records.

In an effort to keep the list of application instances confidential at least a portion of the DNS text record (e.g., after the initial "v=aim1;" string element, among other elements listed above) may also be encrypted. In some implementations, this feature of the disclosure can facilitate confidentiality as, without this feature, it may be possible for the DNS text record for a given Internet-facing application to be visible to anyone on the Internet.

Continuing with the non-limiting example shown in FIG. 4, Anycast DNS and/or DNS client subnet can be used to direct users to the closest application instance (e.g., the first application instance 422a), based on the results of the network path probing. This can be done either proactively before an actual failure (e.g., based on declining performance) or reactively (e.g., to switch a given client to a different instance on failure of its primary).

In implementations in which DNS client subnet methodologies are employed, each application instance (e.g., the first application instance 422a, the second application instance 422b, and/or the third application instance 422c, etc.) may have a unique IP address. In such implementations, this unique IP address can be inserted directly into the DNS text record as describe above.

In implementations in which Anycast DNS methodologies are employed, each application instance (e.g., the first application instance 422a, the second application instance 422b, and/or the third application instance 422c, etc.) may share the same IP address and may rely on IP routing to direct users to the closest instance. In these scenarios, each application instance may typically also have a unique IP assigned thereto which, besides handling management and/or content uploads, can also be used to test one or more applications and/or application instances associated with the application(s). In such implementation, this unique IP address can be inserted into the DNS text record, as opposed to the IP addresses that may be shared among all (or at least a portion of multiple) application instances, such as the first application instance 422a, the second application instance 422b, and/or the third application instance 422c, etc.

Figure 5:
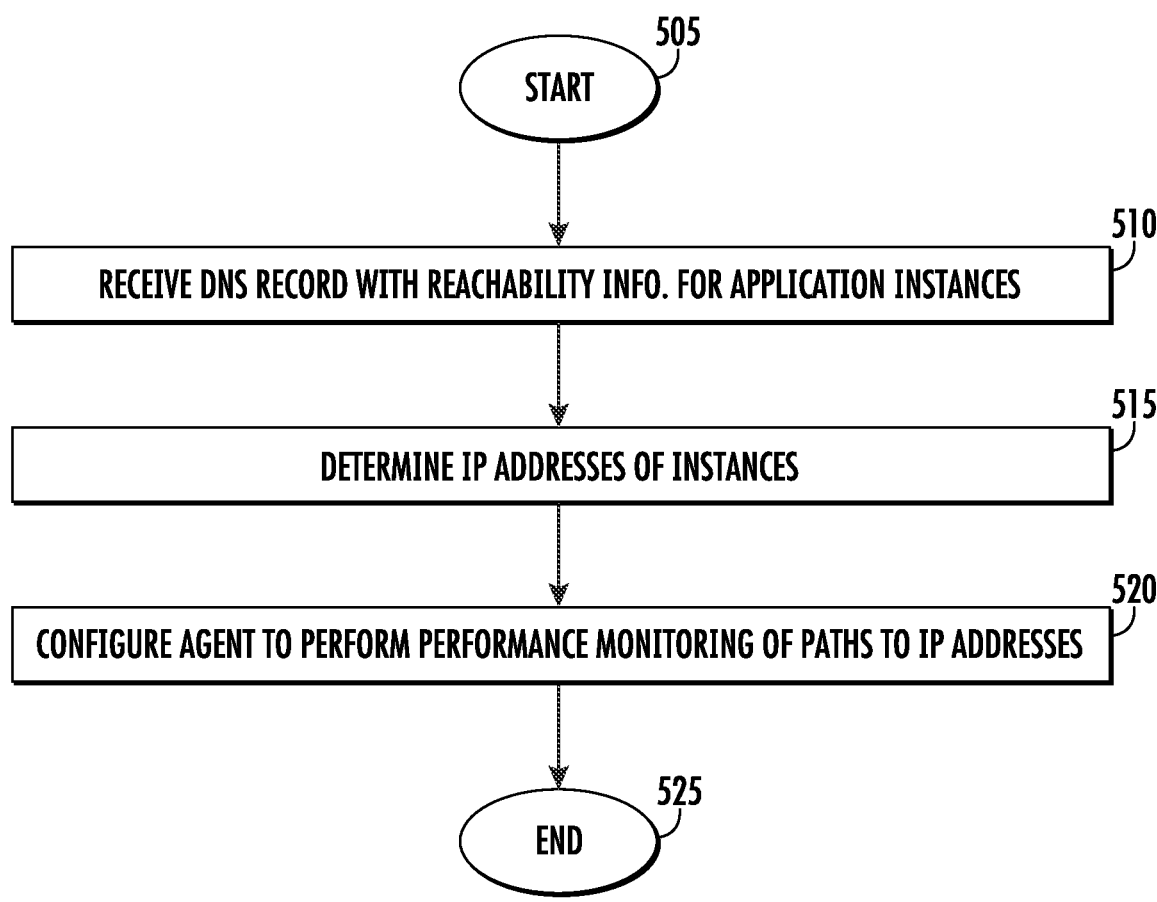
FIG. 5 illustrates an example simplified procedure for multi-path monitoring of application instances using DNS-based reachability information.

FIG. 5 illustrates an example simplified procedure for multi-path monitoring of application instances using DNS-based reachability information, in accordance with one or more implementations described herein. For example, a non-generic, specifically configured device for multi-path monitoring of application instances using DNS-based reachability information (e.g., device 200, an apparatus, a client device, etc.), may perform procedure 500 (e.g., a method or process) by executing stored instructions (e.g., path monitoring process 248). Alternatively, a tangible, non-transitory, computer-readable medium may have computer-executable instructions stored thereon that, when executed by a processor on a computer/device, cause it to perform a method according to procedure 500.

The procedure 500 may start at step 505, and continues to step 510, where, as described in greater detail above, the device (e.g., a controller, processor, apparatus, etc.) may receive a domain name system text record containing Internet reachability information for a plurality of application instances of a particular application identified by a given domain name. In some instances, the device receives the domain name system text record in response to a domain name system request for the given domain name. In one implementation, the plurality of application instances comprises all available instances of the particular application. In some cases, the domain name system text record is encrypted. In various implementations, the domain name system text record contains an Anycast address shared by all application instances among the plurality of application instances and a unique management address for each application instance among the plurality of application instances.

At step 515, as detailed above, the device may determine a primary Internet address for a primary application instance of the plurality of application instances and one or more secondary Internet addresses for one or more respective secondary application instances of the plurality of application instances based on the Internet reachability information. In some implementations, the domain name system text record includes labels for the plurality of application instances. In such cases, the device may also select the primary application instance and one or more secondary application instances based on the labels. In one implementation, the labels indicate regional locations of the plurality of application instances, and wherein the primary application instance and the one or more secondary application instances are selected based on the regional locations of the plurality of application instances.

At step 520, the device may configure a path monitoring agent to perform path performance monitoring of a network path to the primary Internet address and perform path performance monitoring of one or more alternate network paths to the one or more secondary Internet addresses. In some instances, the device may also predict a performance impact of a failure of the primary application instance, based on a result of the path performance monitoring. In various implementations, the device may also cause, based on the path performance monitoring, a client of the particular application to send traffic to an Internet address selected from the one or more secondary Internet addresses. In some implementations, the device comprises an endpoint client of the particular application and executes the path monitoring agent to send probe packets along the network path to the primary Internet address and along the one or more alternate network paths to the one or more secondary Internet addresses.

Procedure 500 then ends at step 525.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, for the enablement of monitoring agents to measure application performance and/or user metrics (e.g., jitter, loss, etc.) for alternative application IP instances by employing encrypted and labeled DNS text records which can include reachability information for all application instances, as opposed to only the primary application instances. Accordingly, implementations herein provide capabilities to enable application performance and user experience monitoring of not only the closest application, but also application instances that can be used in case of application failures for geographically distributed applications. As detailed above, these and other implementations of the disclosure leverage DNS text records to proactively and automatically handle failover of primary application instances in order to improve the overall function of a computing environment in which such implementations are deployed, thereby providing an enhanced user experience.

While there have been shown and described illustrative implementations that provide for multi-path monitoring of application instances using DNS-based reachability information, it is to be understood that various other adaptations and modifications may be made within the spirit and scope of the implementations herein. For example, while certain implementations are described herein with respect to geographically disparate servers that are running multiple applications, the techniques herein are not limited as such and may be used for other types of machine learning tasks, such as making inferences or predictions, in other implementations. In addition, while certain protocols are shown, other suitable protocols may be used, accordingly. Further, while certain types of scripting languages and common data formats are discussed herein, the techniques herein may be used in conjunction with any scripting language or common data format. Moreover, while certain configurations and layouts of graphical representations have been shown herein, other types not specifically shown or mentioned may also be used, and those herein are merely examples.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:
receiving, by a device, a domain name system text record containing Internet reachability information for a plurality of application instances of a particular application identified by a given domain name;
determining, by the device, a primary Internet address for a primary application instance of the plurality of application instances and one or more secondary Internet addresses for one or more respective secondary application instances of the plurality of application instances based on the Internet reachability information;
configuring, by the device, a path monitoring agent to perform path performance monitoring of a network path to the primary Internet address and perform path performance monitoring of one or more alternate network paths to the one or more secondary Internet addresses, wherein the path monitoring agent comprises software that is installed on a computing device and is part of an observability intelligence platform; and
causing, by the device and based on the path performance monitoring, a client of the particular application to send traffic to an Internet address selected from the one or more secondary Internet addresses.

2. The method as in claim 1, further comprising:
predicting a performance impact of a failure of the primary application instance, based on a result of the path performance monitoring.

3. The method as in claim 1, wherein the device receives the domain name system text record in response to a domain name system request for the given domain name.

4. The method as in claim 1, wherein the plurality of application instances comprises all available instances of the particular application.

5. The method as in claim 1, further comprising:
causing, by the device and based on the path performance monitoring, a client of the particular application to send traffic to an Internet address selected from the one or more secondary Internet addresses.

6. The method as in claim 1, wherein the domain name system text record includes labels for the plurality of application instances, and wherein the method further comprises:
selecting the primary application instance and one or more secondary application instances based on the labels.

7. The method as in claim 6, wherein the labels indicate regional locations of the plurality of application instances, and wherein the primary application instance and the one or more secondary application instances are selected based on the regional locations of the plurality of application instances.

8. The method as in claim 1, wherein the domain name system text record is encrypted.

9. The method as in claim 1, wherein the domain name system text record contains an Anycast address shared by all application instances among the plurality of application instances and a unique management address for each application instance among the plurality of application instances.

10. The method as in claim 1, wherein the device comprises an endpoint client of the particular application and executes the path monitoring agent to send probe packets along the network path to the primary Internet address and along the one or more alternate network paths to the one or more secondary Internet addresses.

11. An apparatus, comprising:
one or more network interfaces to communicate with a network;
a processor coupled to the one or more network interfaces and configured to execute one or more processes; and
a memory configured to store a process that is executable by the processor, the process, when executed, configured to:
receive a domain name system text record containing Internet reachability information for a plurality of application instances of a particular application identified by a given domain name;
determine a primary Internet address for a primary application instance of the plurality of application instances and one or more secondary Internet addresses for one or more respective secondary application instances of the plurality of application instances based on the Internet reachability information; and
configure a path monitoring agent to perform path performance monitoring of a network path to the primary Internet address and perform path performance monitoring of one or more alternate network paths to the one or more secondary Internet addresses, wherein the path monitoring agent comprises software that is installed on a computing device and is part of an observability intelligence platform; and
cause, based on the path performance monitoring, a client of the particular application to send traffic to an Internet address selected from the one or more secondary Internet addresses.

12. The apparatus as in claim 11, wherein the process when executes is further configured to:
predict a performance impact of a failure of the primary application instance, based on a result of the path performance monitoring.

13. The apparatus as in claim 11, wherein the plurality of application instances comprises all available instances of the particular application.

14. The apparatus as in claim 11, wherein the apparatus comprises an endpoint client of the particular application and executes the path monitoring agent to send probe packets along the network path to the primary Internet address and along the one or more alternate network paths to the one or more secondary Internet addresses.

15. The apparatus as in claim 11, wherein the process when executes is further configured to:
cause, based on the path performance monitoring, a client of the particular application to send traffic to an Internet address selected from the one or more secondary Internet addresses.

16. The apparatus as in claim 11, wherein the domain name system text record includes labels for the plurality of application instances, and wherein the process when executed is further configured to:
select the primary application instance and one or more secondary application instances based on the labels.

17. The apparatus as in claim 16, wherein the labels indicate regional locations of the plurality of application instances, and wherein the primary application instance and the one or more secondary application instances are selected based on the regional locations of the plurality of application instances.

18. The apparatus as in claim 11, wherein the domain name system text record is encrypted.

19. The apparatus as in claim 11, wherein the domain name system text record contains an Anycast address shared by all application instances among the plurality of application instances and a unique management address for each application instance among the plurality of application instances.

20. A tangible, non-transitory, computer-readable medium having computer-executable instructions stored thereon that, when executed by a processor on a computer, cause the computer to perform a method comprising:
 receiving a domain name system text record containing Internet reachability information for a plurality of application instances of a particular application identified by a given domain name;
 determining a primary Internet address for a primary application instance of the plurality of application instances and one or more secondary Internet addresses for one or more respective secondary application instances of the plurality of application instances based on the Internet reachability information;
 configuring a path monitoring agent to perform path performance monitoring of a network path to the primary Internet address and perform path performance monitoring of one or more alternate network paths to the one or more secondary Internet addresses, wherein the path monitoring agent comprises software that is installed on a computing device and is part of an observability intelligence platform; and
 causing, based on the path performance monitoring, a client of the particular application to send traffic to an Internet address selected from the one or more secondary Internet addresses.

\* \* \* \* \*